United States Patent
Jozwiak et al.

(10) Patent No.: US 12,438,343 B2
(45) Date of Patent: Oct. 7, 2025

(54) MODULAR POWER DISTRIBUTION UNIT

(71) Applicant: Littelfuse, Inc., Chicago, IL (US)

(72) Inventors: Andrew Jozwiak, San Antonio, TX (US); Jesus Roberto Morales, Chihuahua (MX)

(73) Assignee: Littelfuse, Inc., Rosemont, IL (US)

( * ) Notice: Subject to any disclaimer, the term of this patent is extended or adjusted under 35 U.S.C. 154(b) by 375 days.

(21) Appl. No.: 17/953,483

(22) Filed: Sep. 27, 2022

(65) Prior Publication Data

US 2024/0106205 A1 Mar. 28, 2024

(51) Int. Cl.
*H02B 1/28* (2006.01)
*H02B 1/46* (2006.01)

(52) U.S. Cl.
CPC .............. *H02B 1/28* (2013.01); *H02B 1/46* (2013.01)

(58) Field of Classification Search
CPC .................................... H02B 1/28; H02B 1/46
USPC ........................................................... 174/50
See application file for complete search history.

(56) References Cited

FOREIGN PATENT DOCUMENTS

CN 107910780 A 4/2018

OTHER PUBLICATIONS

European Search Report for EP Application No. 23198064.0, dated Feb. 13, 2024, 11 pages.
Made-In-China.com, "Landworld 3.3kw Obc+2kw DC+PDU EV Charger Small Size Electric Vehicle DC+Obc+PDU Lw3HD2KCB3K3-D14c380-W," XP093124567, May 26, 2022, 2 pages. [online source] URL: https://landworld.en.made-in-china.com/product/VJirCbsEEWcZ/China-Landworld-3-3kw-Obc-DC-PDU-EV-Charger-Small-Size-Electric-Vehicle-DC-Obc-PDU-Lw3HD2KCB3K3-D14c380-W.html.
Gehause, "Keile Statt Schrauben—Montageleichte Flanschgehaeuse Widerstehen Rauher Umgebung," Vogel Business Media GMBH & CO.KG, vol. 69, No. 16, Oct. 14, 1987, pp. 60-62. XP000577389, ISSN: 1431-9578.

*Primary Examiner* — Tremesha W Burns
(74) *Attorney, Agent, or Firm* — KDW Firm PLLC

(57) ABSTRACT

A Power Distribution Unit (PDU) includes a cover and a base. The cover has multiple fastener receptacles and a pair of indentations located along its outer edge. The base has an opening on a short side of the PDU for receiving a cable connector and a window on a long side of the PDU, the window being secured to a second cover. The long side is perpendicular to the short side.

20 Claims, 14 Drawing Sheets

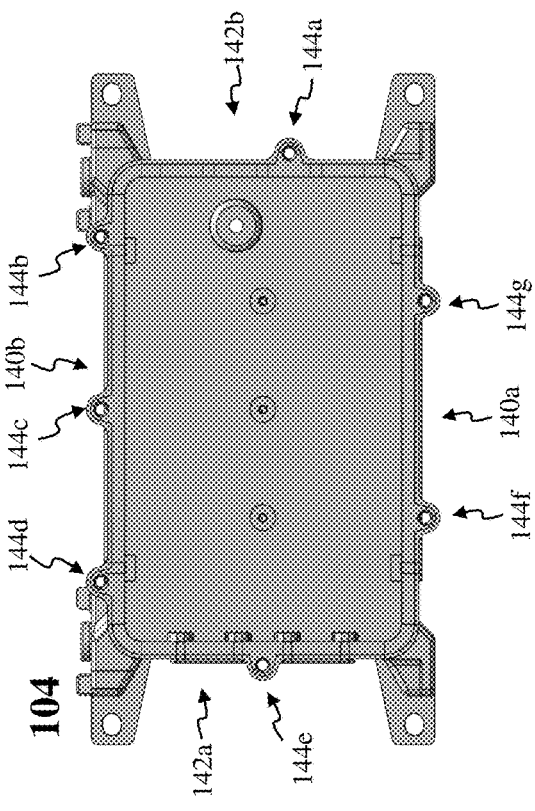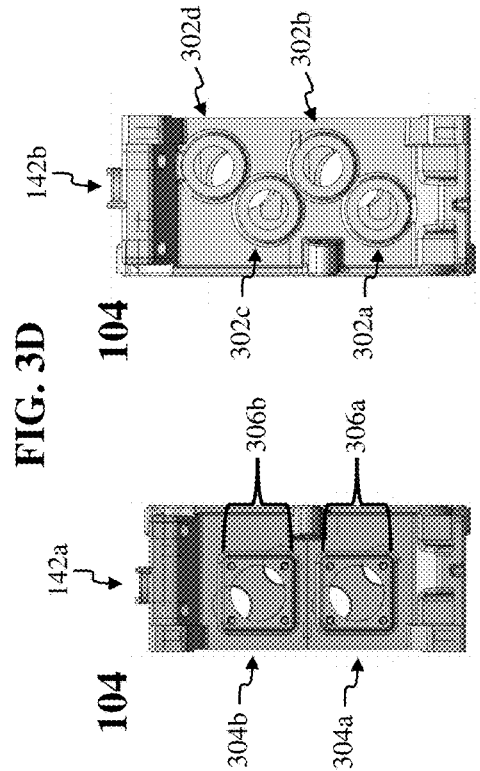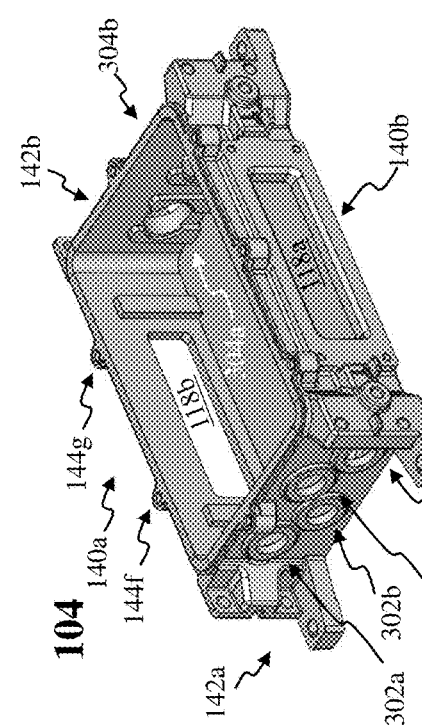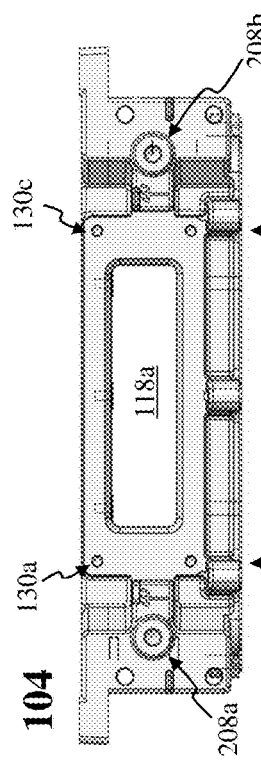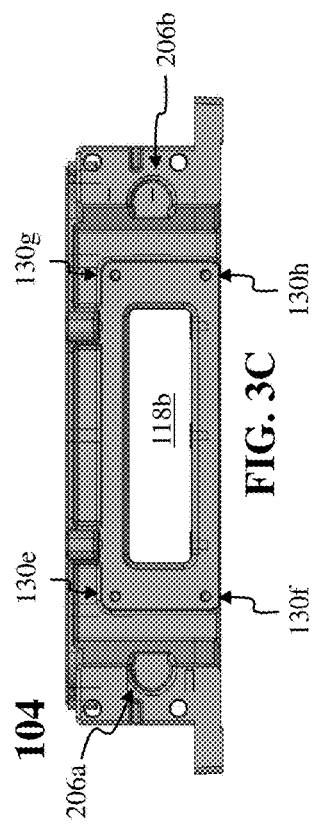

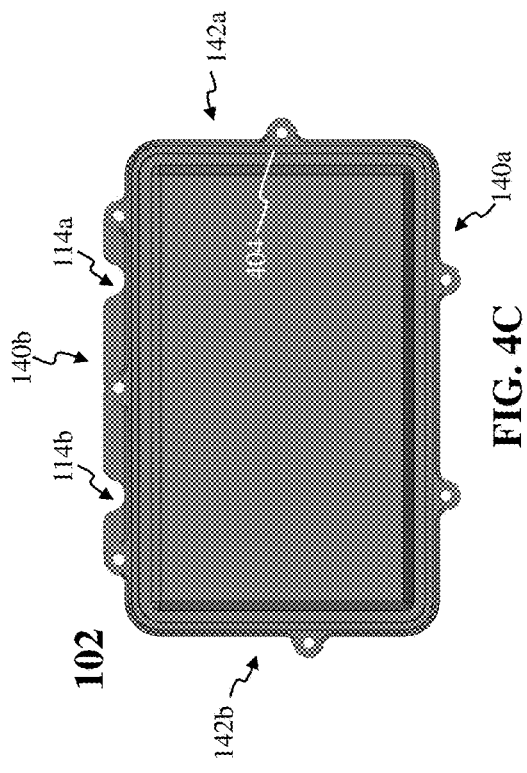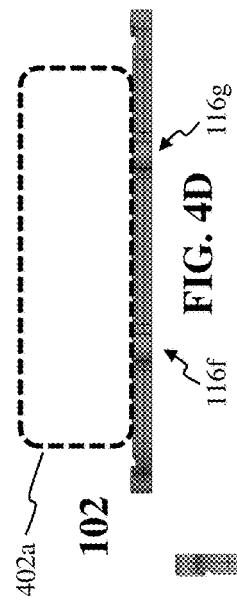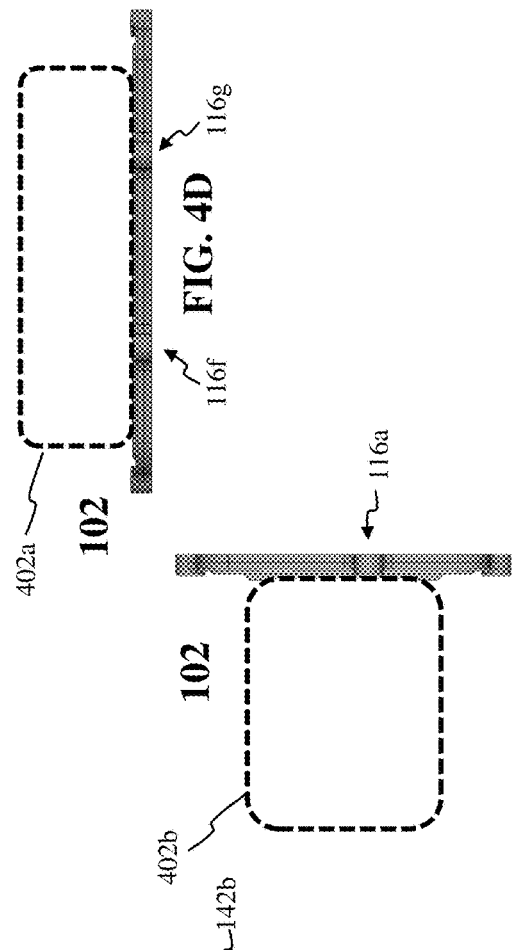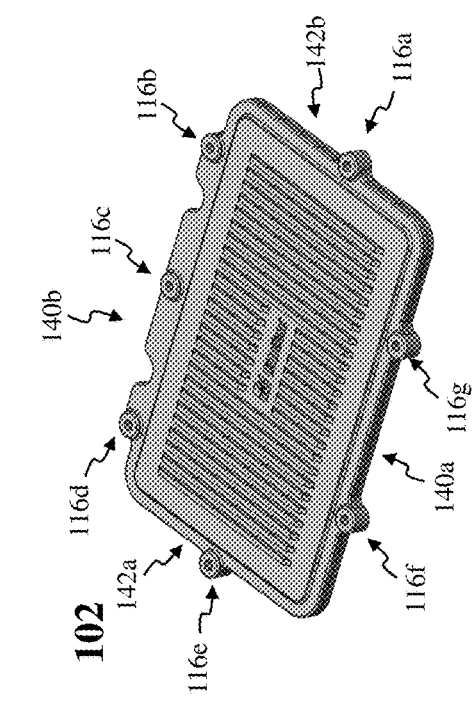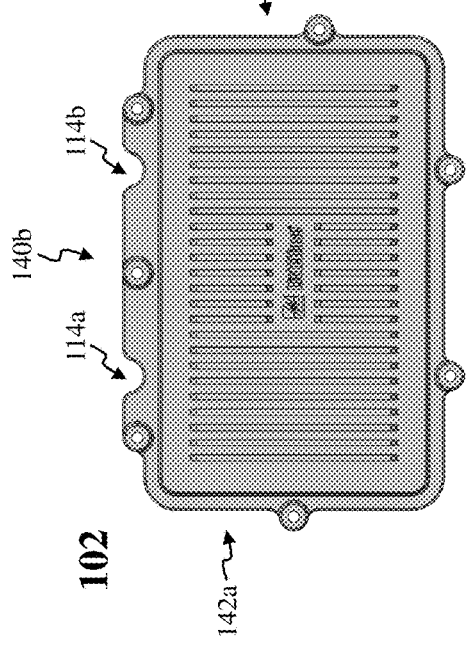
FIG. 4C
FIG. 4D
FIG. 4E
FIG. 4A
FIG. 4B

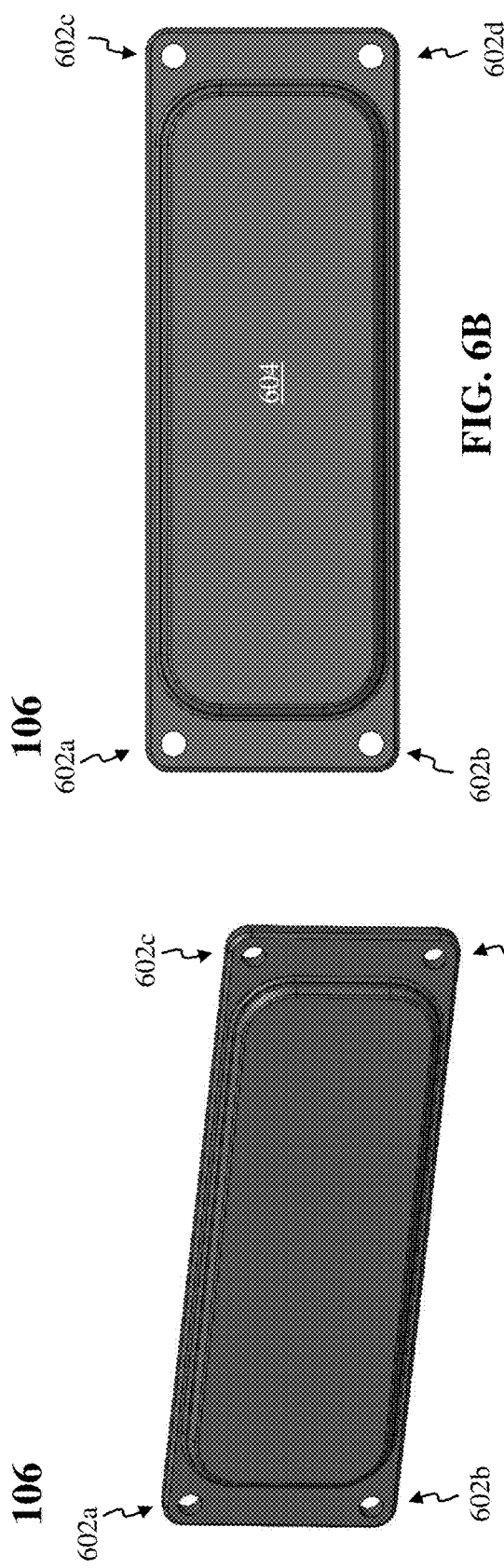
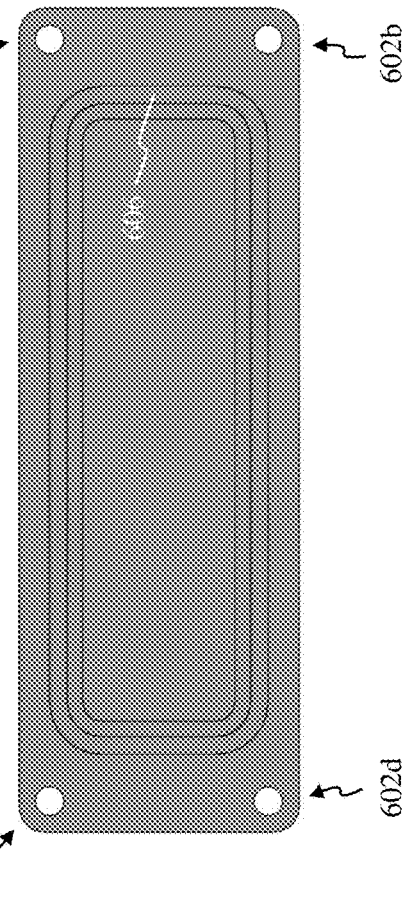
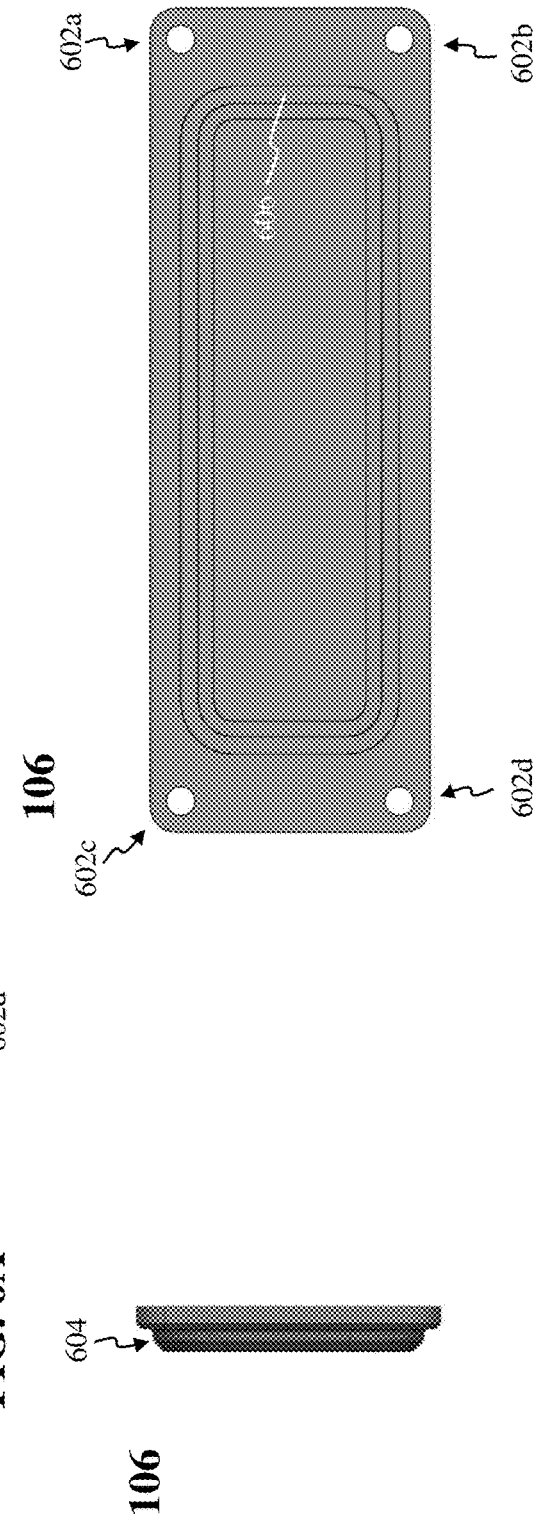
FIG. 6B
FIG. 6D
FIG. 6A
FIG. 6C

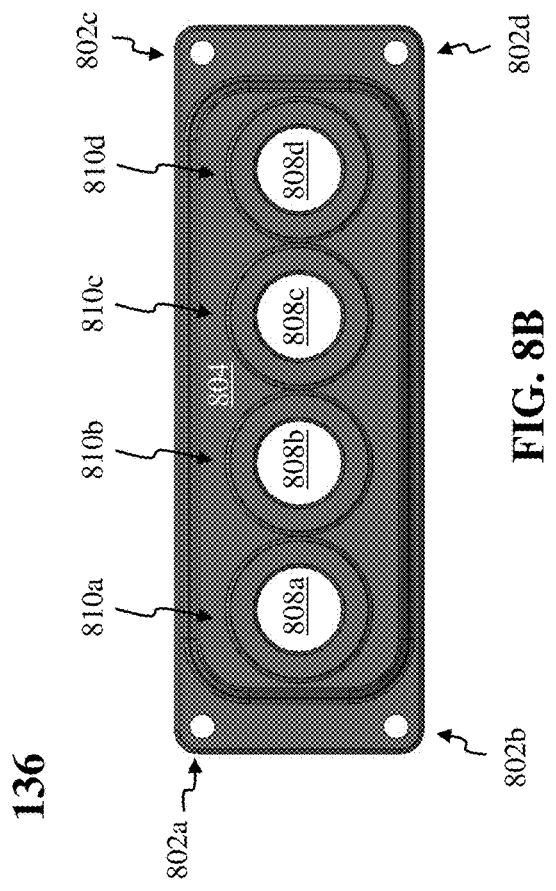
FIG. 8B
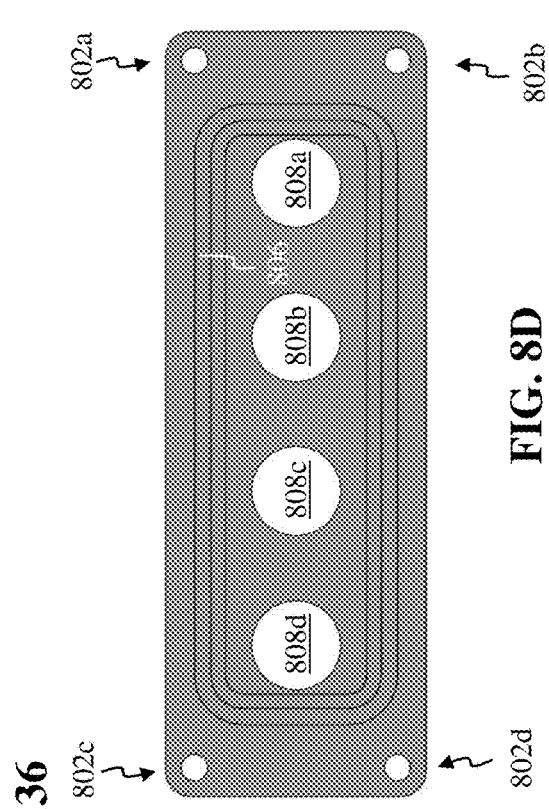
FIG. 8D
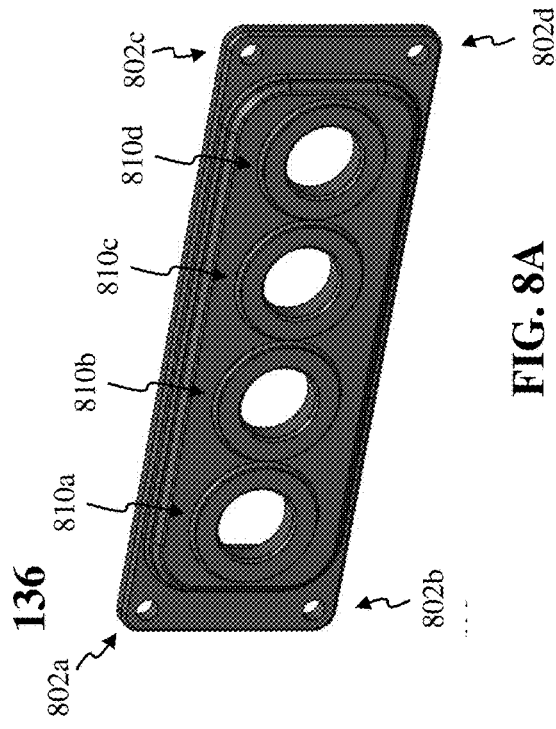
FIG. 8A
FIG. 8C

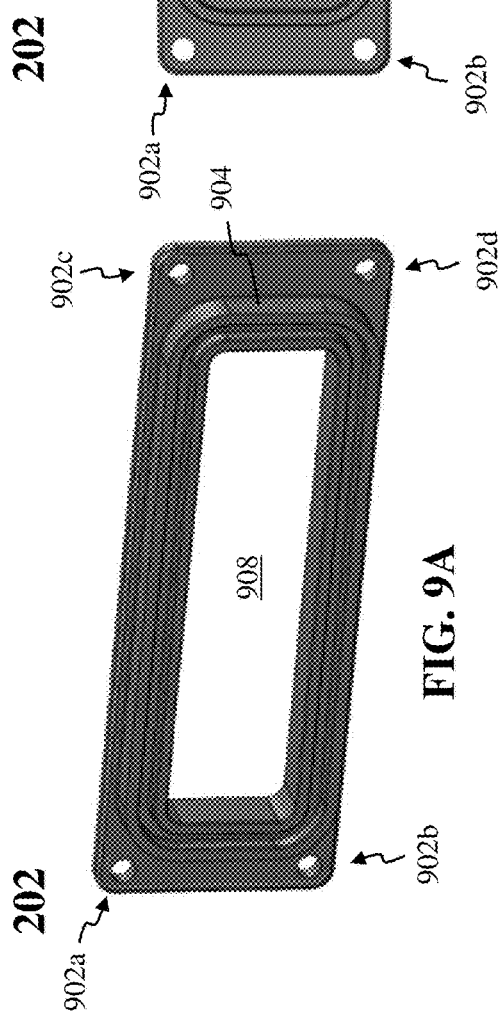
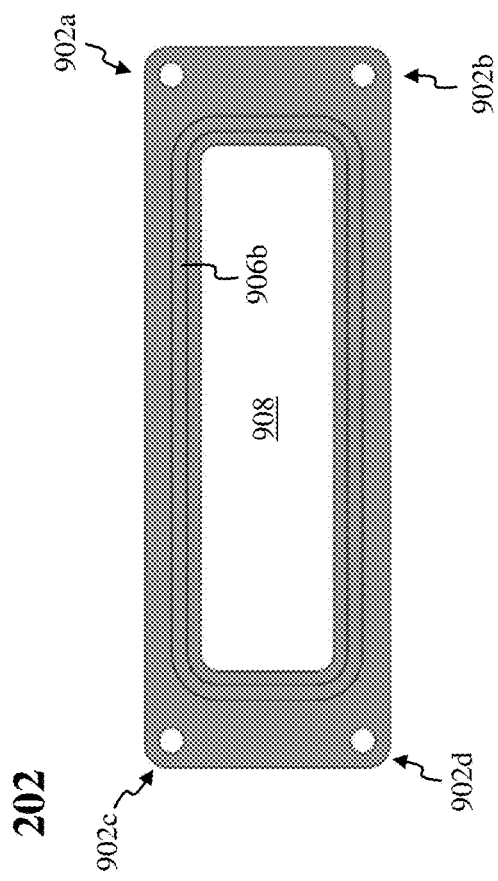
FIG. 9A
FIG. 9B
FIG. 9C
FIG. 9D

MODULAR POWER DISTRIBUTION UNIT

FIELD OF THE DISCLOSURE

Embodiments of the present disclosure relate to power distribution units for high-voltage applications.

BACKGROUND

Power Distribution Units (PDUs) are installed in high-voltage applications to ensure circuits are protected, controlled, and/or sensed. PDUs provide centralized, safe power distribution for many applications, and may include fuses, relays, circuit breakers, current sensing components, and Controller Area Network (CAN) and Local Internet Network (LIN) modules (hereinafter, "PDU device(s)"). PDUs are common in industrial applications, such as heavy-duty trucks, agricultural, and construction equipment, although the applications for PDUs are expanding.

PDUs consist of a housing that holds the PDU devices, where the housing is designed to accept input cables, output cables, and busbars. Off-the-shelf or customized cabling and/or connectors may be used to connect to a PDU or may have their own custom cables. The ways in which the cabling may be coupled to the PDU devices vary. The number and size of PDU devices also vary from application to application. Some customers demand IP67/IP69K protection against ingress of liquid and other materials into the PDU. The myriad configurations and customer requirements drive up the cost of PDUs.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a Power Distribution Unit (PDU) in accordance with the present disclosure may include a short side and a long side, the long side being perpendicular to the short side. The PDU also includes a cover and a base. The cover has multiple fastener receptacles and a pair of indentations located along its outer edge. The base has an opening on the short side for receiving a cable connector and a window on the long side, the window being secured to a second cover.

An exemplary embodiment of a PDU assembly in accordance with the present disclosure may include a first PDU, a second PDU, and a connecting plate. The first PDU has a base and a cover, the base having a rectangular top surface and a long side surface with a window. The cover has an edge shaped to fit over the rectangular top surface and having multiple fastener receptacles. The second PDU features a second base having a second long side surface with a window. The connecting plate has first and second raised portions, one on each side. The first raised portion is shaped to fit into the window and the second raised portion is shaped to fit into the second window. The connecting plate mates the first PDU with the second PDU.

BRIEF DESCRIPTION OF THE DRAWINGS

FIGS. 3A-3F are diagrams illustrating a base of the PDU of FIGS. 1A-1C, in accordance with exemplary embodiments;

FIGS. 4A-4C are diagrams illustrating a cover of the PDU of FIGS. 1A-1C, in accordance with exemplary embodiments;

FIGS. 6A-6D are diagrams illustrating a closed cover of the PDU of FIGS. 1A-1C, in accordance with exemplary embodiments;

FIGS. 8A-8D are diagrams illustrating an output cover of the PDU of FIGS. 1A-1C, in accordance with exemplary embodiments;

FIGS. 9A-9D are diagrams illustrating a connecting plate of the PDU of FIGS. 1A-1C, in accordance with exemplary embodiments.

DETAILED DESCRIPTION

A Power Distribution Unit (PDU) and PDU assembly are disclosed. The flexible and modular PDU has sides dedicated to receiving input cables and/or connectors and gland-style connectors and other sides having windows that can be affixed with additional input cable covers, gland-style connector covers, custom covers, and connecting plate covers. Cable inputs can be closed off with cable connector covers. Connecting plate covers can be used to connect two or more PDUs together to form a PDU assembly. The modular PDU can be used in a variety of different high-voltage environments.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
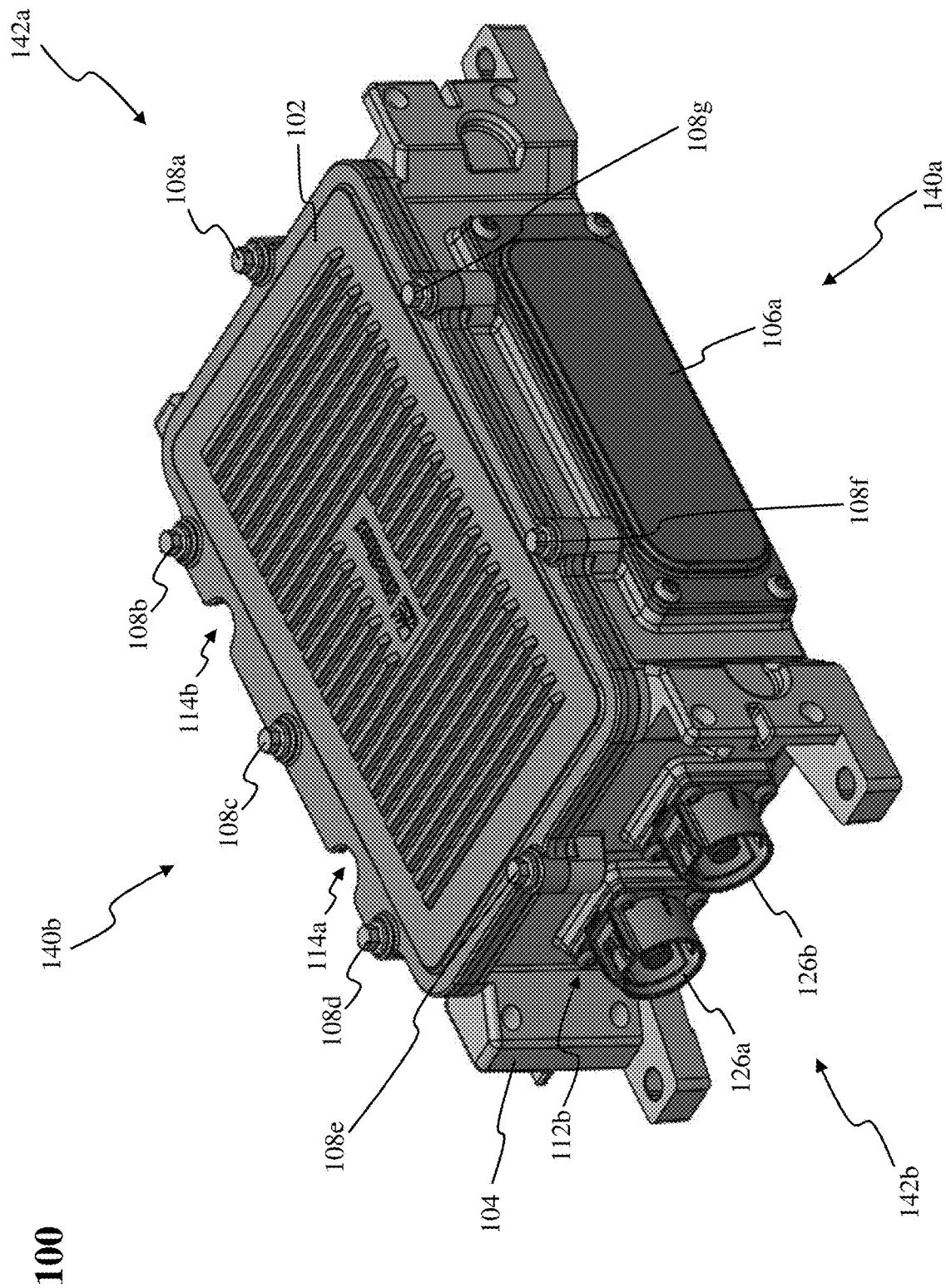
FIGS. 1A-1C are diagrams illustrating a power distribution unit (PDU), in accordance with exemplary embodiments.
Figure 1B:
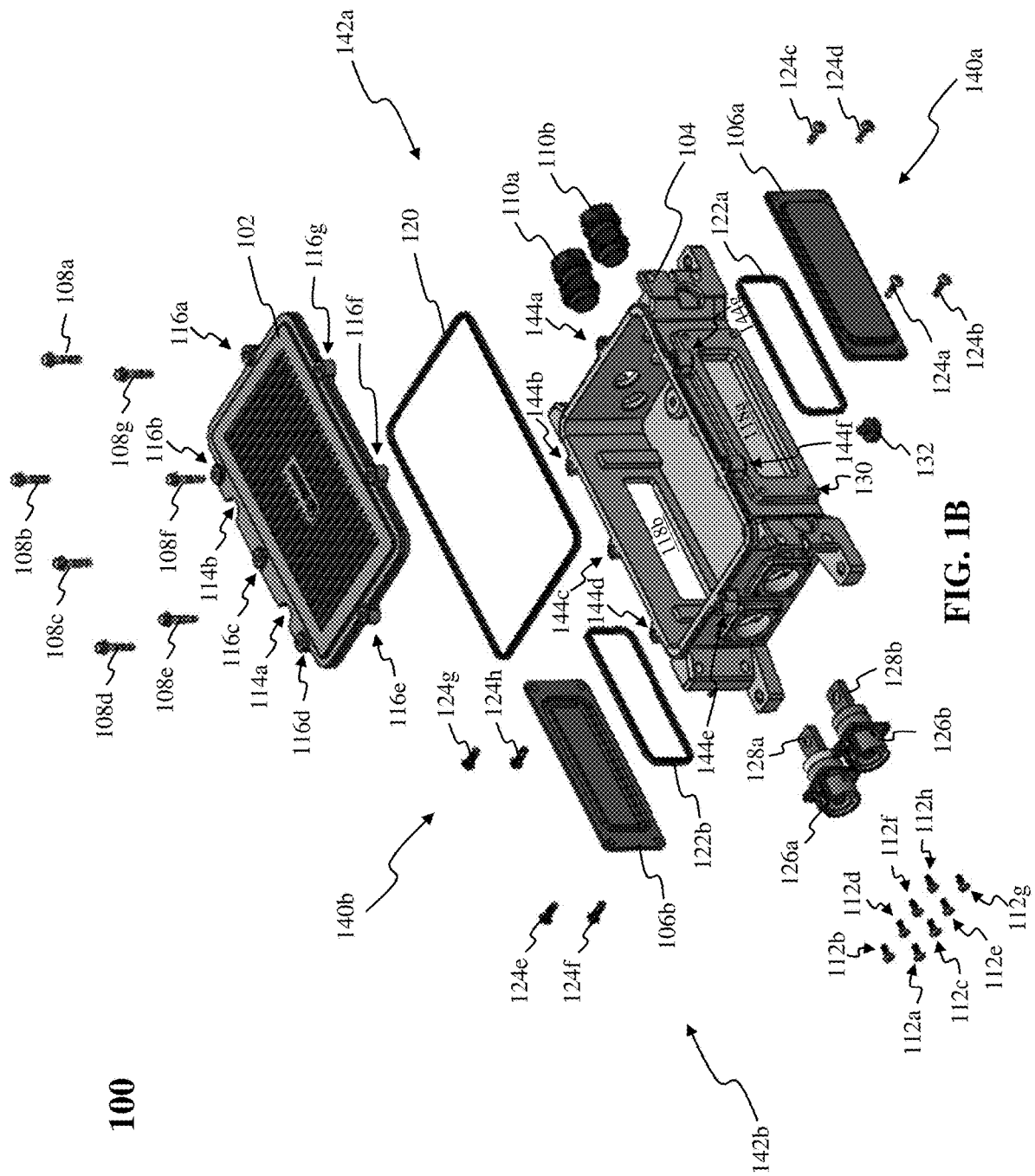
Figure 1C:
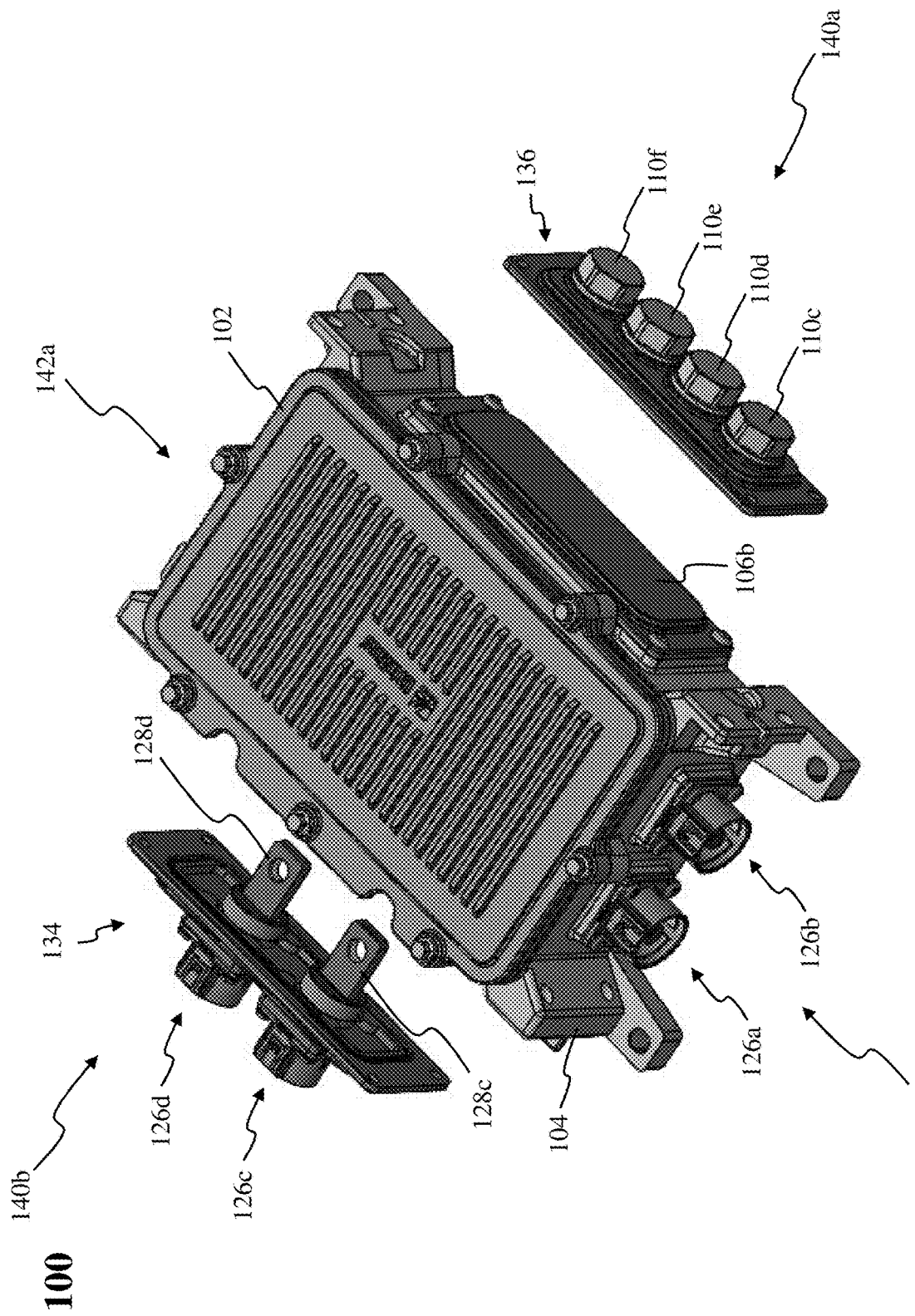

FIGS. 1A-1C are representative drawings of a Power Distribution Unit (PDU) 100 for power distribution applications, according to exemplary embodiments. FIG. 1A is a perspective view, FIG. 1B is an exploded perspective view, and FIG. 1C is a partially exploded perspective view of the PDU 100, along with alternate configurable side plates. In non-limiting embodiments, the PDU 100 is used in high-voltage applications. The PDU 100 consists of a base 104 and a cover 102. In exemplary embodiments, both the base 104 and the cover 102 are made of a conductive material, such as metal. The base 104 includes a cavity inside which is seated one or more PDU devices, such as a fuse or relay. The cover 102, once fixably attached to the base 104, protects the PDU device(s) within the base 104 from ingress of fluid or debris. The cover 102 and base 104 may thus be thought of as the housing of the PDU 100.

The PDU 100 includes two long sides 140a and 140b (collectively, "long side(s) 140"), and two short sides 142a and 142b (collectively, "short side(s) 142"). In a non-limiting embodiment, the two long sides 140 are parallel to one another and orthogonal to the two short sides 142, and the two short sides are parallel to one another, resulting in a generally rectangular shape. Also, in a non-limiting embodiment, the two long sides 140 may be longer than, the same length as, or shorter than the two short sides 142 and the long side 140a may be a different length than long side 140b, and short side 142a may be a different length than short side 142b. Many of the features of the PDU 100, as well as those of the cover 102 and the base 104, will be described with respect to the long sides 140 and short sides 142 designations.

A plurality of cover fasteners 108a-g (collectively, "cover fastener(s) 108") are used to secure the cover 102 to the base 104. The cover 102 includes a plurality of fastener receptacles 116a-g (collectively, "fastener receptacle(s) 116"). Similarly, the base 104 includes a plurality of fastener receptacles 144a-g (collectively, "fastener receptacle(s) 144"). The cover fasteners 108 may be caps, connectors, plugs, bolts, screws, rivets, or other types of securing implements.

The fastener receptacles 116 and 144 may be shaped, threaded, or otherwise configured to receive the cover fasteners 108. The cover fasteners 108 may be coupled with gaskets or washers for securing the cover 102 to the base 104. The fastener receptacles 116 are made of the same material as the cover 102, preferably a conductive metal. Compression of the separate seal 120 between the cover 102 and the base 104 facilitates having a liquid- and debris-tight seal once the cover is attached to the base 104 using the cover fasteners 108.

In a non-limiting example, seven cover fasteners 108, seven fastener receptacles 116 (cover 102), and seven fastener receptacles 144 (base 104) are shown, although the number of cover fasteners 108, fastener receptacles 116, and fastener receptacle 144 may vary. Cover fastener 108a, fastener receptacle 116a, and fastener receptacle 144a are on short side 142a, three cover fasteners 108b-d, respective fastener receptacles 116b-d, and respective fastener receptacles 144b-d are on long side 140b, a cover fastener 108e, fastener receptacle 116e, and fastener receptacle 144e are on short side 142b, and two cover fasteners 108f-g, respective fastener receptacles 116f-g, and respective fastener receptacles 144f-g are on long side 140a.

The long side 140a of the base 104 includes a window 118a; similarly, the long side 140b of the base includes a window 118b (collectively, "window(s) 118"). A long side cover 106a (FIGS. 1A-B) and a long side cover 106b (FIG. 1B) (collectively, "long side cover(s) 106") are used to close off respective windows 118a and 118b of the base 104. In non-limiting embodiments, window 118a is planar to (in the same plane as) window 118b. A seal 122a is positioned between the base 104 and a circumferential (outer) edge of the long side cover 106a (surrounding the window 118a), with long side cover bolts 124a-d, which may be bolts, screws, caps, rivets, or other securing means, being inserted into designated receivers 130 around the window 118a of the base. The long side cover bolts 124a-d thus secure the long side cover 106a to the base; similarly, a seal 122b is positioned between the base 104 and a circumferential edge of the long side cover 106b (surrounding the window 118b), with long side cover bolts 124e-h being inserted in designated receivers 130 around the window 118b to secure the long side cover 106b to the base (collectively, "seals 122" and "long side cover bolt(s) 124").

Although a larger size than the seals 122, a seal 120 is similarly positioned between the base 104 and the cover 102 before the cover is secured to the base by the cover fasteners 108. The seals 120 and 122 help to protect the PDU devices from ingress of liquid or debris into the PDU 100. In exemplary embodiments, the PDU 100 is IP67/IP69K-compliant.

Cable connectors 126a-b, with cable connector 126a having terminal 128a and cable connector 126b having terminal 128b (collectively, "cable connector(s) 126" and "terminal(s) 128") are to be inserted into openings on short side 142b of the PDU 100. The cable connectors 126 are designed to be connected to input cables (not shown). The cable connectors 126 are inserted so that the terminals 128 are on the inside of the base 104, with the terminals being connected to a PDU device or a busbar. The openings on short side 142b are discussed in more detail in FIGS. 3A-3F, below. Cable connector 126a is connected to the base 104 using caps 112a-d while cable connector 126b is connected to the base using caps 112e-h (collectively, "caps 112").

Gland-style connectors 138a-b, for connection to cables, are to be inserted into openings on short side 142a of the PDU 100 (FIG. 1B) and gland-style connectors 110c-f are part of a gland-style connector (GC) cover 136 (FIG. 1C) (collectively, "gland-style connector(s) 138"). The gland-style connectors 110 are designed to be connected to output cables (not shown). There are four openings on short side 142a, and the gland-style connectors 138 would be inserted into the four openings. In exemplary embodiments, the gland-style connectors 138 include rubber seals, for fixable insertion into the openings on short side 142a. The openings on short side 142a are discussed in more detail in FIGS. 3A-3F, below. A one-way valve/vent 132 is inserted into the base 104 to allow a pressure differential, thus managing the internal pressure within the PDU 100.

In exemplary embodiments, the cover 102 features indentations 114a-b (collectively, "indentation(s) 114") on long side 140b of the PDU 100, with indentation 114a being disposed between fastener receptacle 116d and 116c and indentation 114b being disposed between fastener receptacle 116c and 116b. The indentations 114 are shaped so that fastener receptacles 116f and 116g on long side 140a of a second PDU may be closely positioned against indentation 114a and 114b of the PDU 100. In a non-limiting example, the indentations 114 are semi-circular in shape with a first circumference and the fastener receptacles 116 are generally circular in shape with a second circumference, the first circumference being slightly larger than the second circumference. The indentations 114 thus enable multiple PDUs 100 to be stacked closely next to one another to form a PDU assembly. A PDU assembly 200 consisting of PDU 100A and PDU 100B is shown and described in FIGS. 2A-2C, below.

In exemplary embodiments, one or both long side covers 106 may be replaced with covers to enable input or output cables to be attached to the PDU 100. As illustrated particularly in FIG. 1C, long side cover 106b may be replaced with gland-style connector (GC) cover 136. GC cover 136 features four gland-style connectors 110c-f. Alternatively, the GC cover 136 may receive four gland-style connectors 138, such as those on short side 142a of the PDU 100 (FIG. 1B). The exemplary PDU 100 may thus have gland-style connectors 110 on short side 142a (FIG. 1B) and also have gland-style connectors 110 on long side 140a (FIG. 1C).

Similarly, long side cover 106a (FIG. 1B) may be replaced with cable connector (CC) cover 134. CC cover 134 features cable connectors 126c and 126d, where cable connector 126c includes terminal 128c and cable connector 126d includes terminal 128d. Although cable connectors 126c and 126d on CC cover 134 are identical to cable connectors 126a and 126b on short side 142b, the exemplary PDU 100 is capable of supporting a variety of different types of cable connectors, gland-style connectors, and other elements not illustrated in the drawings to support the PDU devices disposed within the PDU.

A common lowest denominator configuration of PDUs support at least two wires (cables) in and four wires (cables) out. The PDU 100 with both windows 118a and 118b being covered with long side covers 106a and 106b, respectively, satisfy this minimum industry standard. For some applications, the input cables being planar with the output cables works well, whereas, for other applications, input cables being orthogonal to the output cables is preferred. The CC cover 134 and GC cover 136 accommodate these variables by allowing the PDU 100 to work in either application, and more. In exemplary embodiments, covers are designed based on customer necessities, and thus variations of the CC cover 134 and GC cover 136 may include changes to the headers, connectors, connections, and so on.

The ability to replace long side cover 106 with either the CC cover 134 or the GC cover 136 shows the versatility of the PDU 100. Additionally, custom long side covers besides those in FIG. 1C may be attached to the base 104 of the PDU 100. For example, a customer may want to have a 12-way plug-in connection for data, such as a CAN connection. A custom-made cover to replace the long side cover 106 or an adaptation of the long side cover 106 can be used to create such an input in the PDU 100. The custom-made cover further reduces the cost of a customer- or application-specific implementation of the PDU 100 by customizing a relatively inexpensive part (the long side cover 106). In this way, the PDU 100 may be adapted to a variety of customer and application requirements.

The long side cover 106, CC cover 134, GC cover 136, and the custom cover are similarly secured to the window 118 they are covering, with the seal 122 being disposed between the base 104 and the selected cover, the seal being positioned along the outside circumference (outer edge) of the window 118, with long side cover bolts 124 being used to secure the covers to the base. No matter the selected cover, the PDU 100 satisfies the IP67/IP69K standard regarding ingress of liquid/debris.

The base 104 of the PDU 100 is relatively small in height and is thus able to accommodate (house) a limited number of PDU devices, depending on the device sizes, such as a single fuse, two fuses, or two fuses and a relay, with the number and type of PDU devices also being dependent on the device connection (schematic) of the customer, in some embodiments. The PDU devices thus have heights smaller than the height of the base 104. In exemplary embodiments, the cover 102 is modified to enable PDU devices having greater heights than that of the base 104 to be housed in the PDU 100. Like the customization of the long side cover 106, modifying the cover 102 to accommodate larger PDU devices is an inexpensive modification relative to modifying the base 104. The PDU 100 is thus able to be used in an array of environments not possible with legacy PDUs.

In some embodiments, the short sides 142 of the PDU 100 are replaced with windows. The two-window PDU would thus become a four-window PDU. The windows would be smaller than windows 118 since the short sides 142 are not as long as the long sides 140 of the PDU 100. The short side windows would also have the flexibility to be mated with covers analogous to long side cover 106, CC cover 134, GC cover 136, and the custom cover that mate with the windows 118. The PDU 100 may thus be adapted to maximize configuration flexibility.

There are applications in which, rather than the two wire in, four wire out configuration that is typical, two wires are coming in and eight wires are going out of the PDU. To address this situation, in exemplary embodiments, the PDU 100 is also designed for modularity. By constructing the PDU 100 with standardized elements, the PDU may be configured in a number of different ways.

Figure 2A:
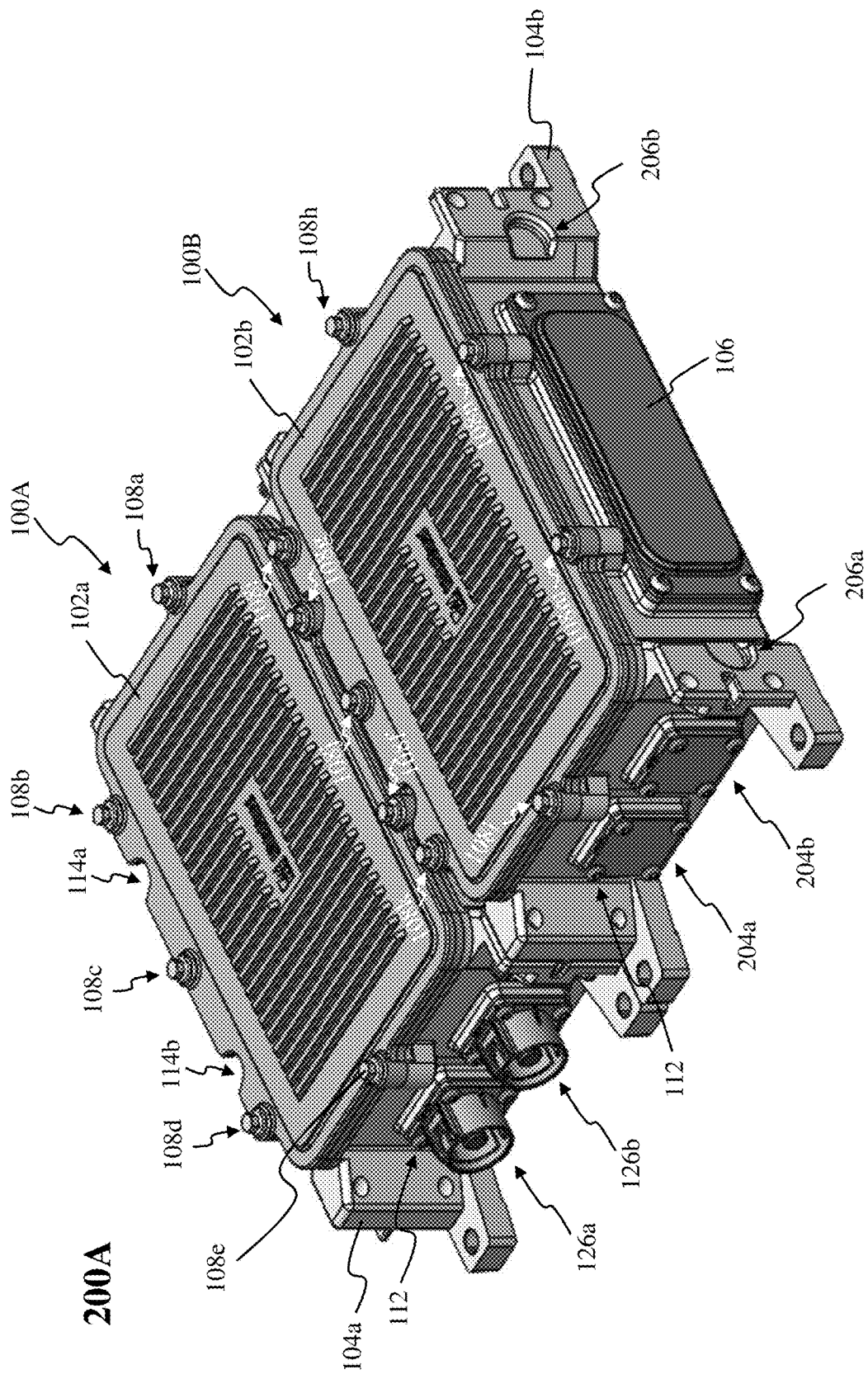
FIGS. 2A-2D are diagrams illustrating a PDU assembly utilizing PDUs, in accordance with exemplary embodiments.
Figure 2B:
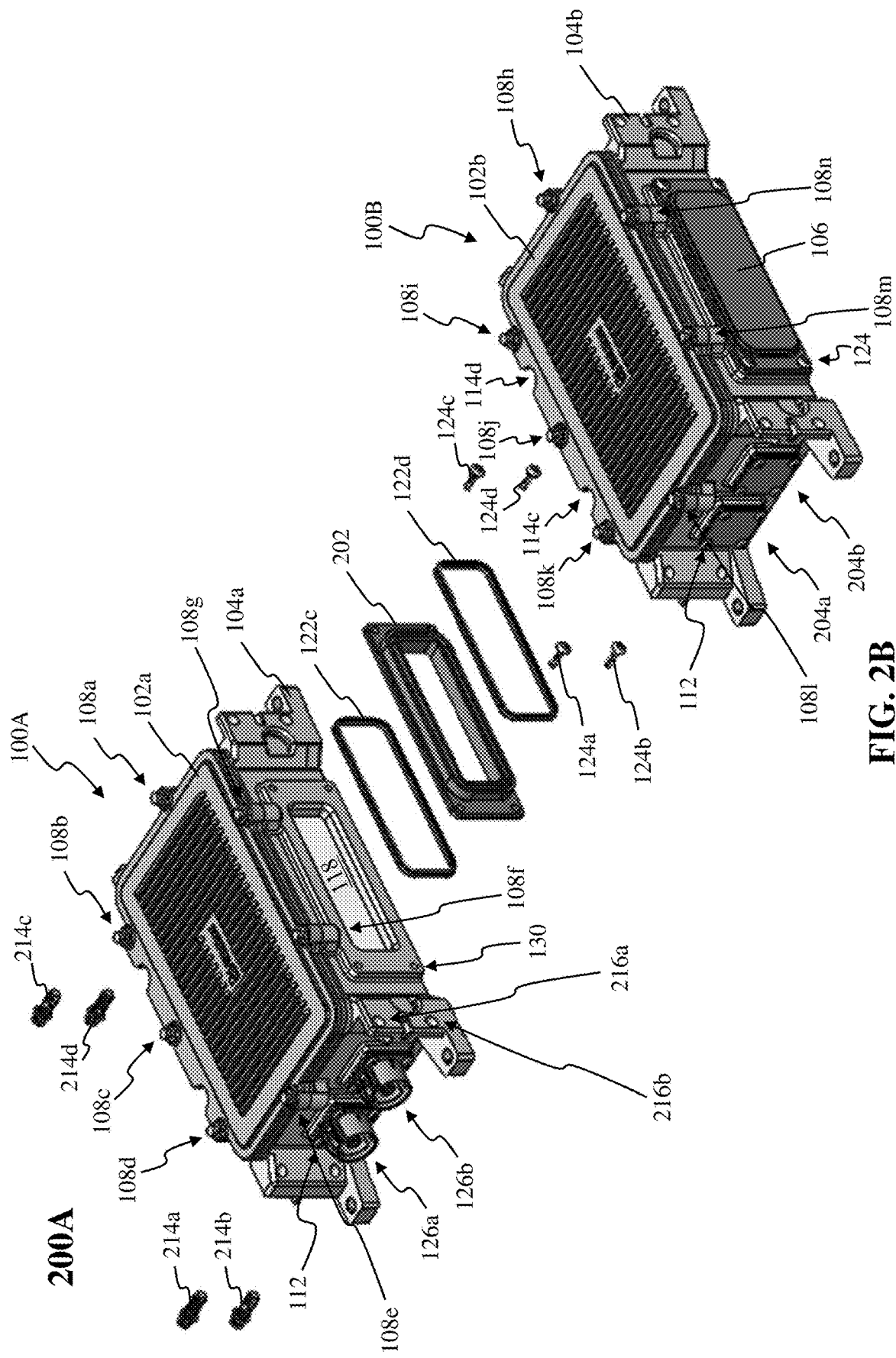
Figure 2C:
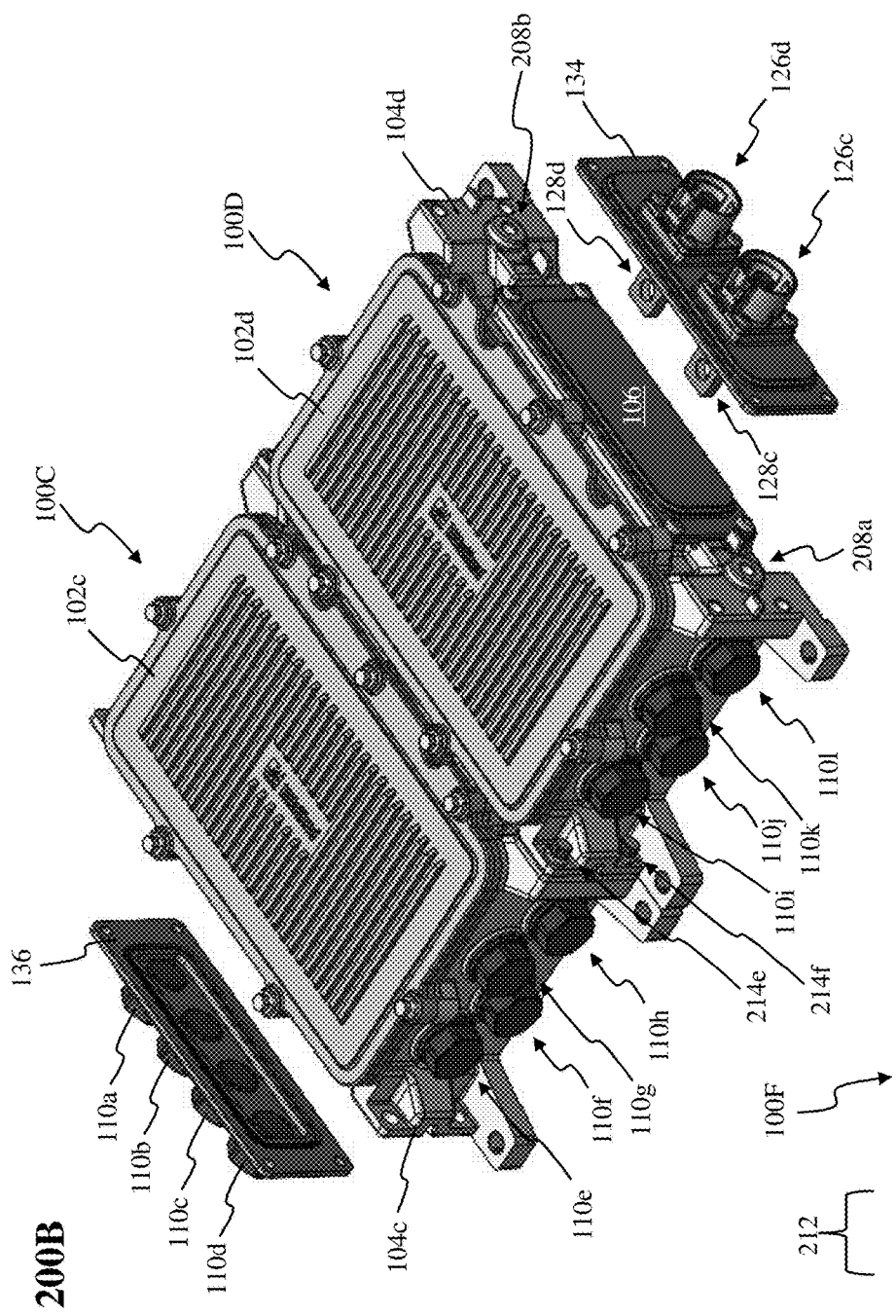
Figure 2D:
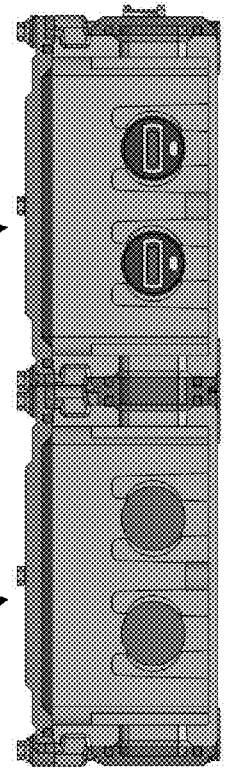

FIGS. 2A-2D are representative drawings of PDU assemblies 200A, 200B, and 200C (collectively, "PDU assemblies 200"), according to exemplary embodiments. FIG. 2A is a perspective view, FIG. 2B is an exploded view of PDU assembly 200A, FIG. 2C is a partially exploded perspective view of the PDU assembly 200B, and FIG. 2D is a cross-sectional view of PDU assembly 200C. The PDU assembly 200A consists of two PDUs 100A and 100B; PDU assembly 200B consists of two PDUs 100C and 100D. The PDUs 100A, 100B, 100C, and 100D are similar to the PDU 100 of FIGS. 1A-1C. PDU 100A of PDU assembly 200A consists of a base 104a and a cover 102a while PDU 100B consists of a base 104b and a cover 102b. PDU 100C of PDU assembly 200B consists of a base 104c and a cover 102c while PDU 100D consists of a base 104d and a cover 102d. A long side cover 106 is shown on one side of the PDU 100B and on one side of the PDU 100D.

The cover 102a of PDU 100A is secured to the base 104a with cover fasteners 108a-g; similarly, the cover 102b of PDU 100B is secured to the base 104b with cover fasteners 108h-n. Both covers 102 include indentations, such as the indentations 114a and 114b shown on cover 102a (FIG. 2A) and the indentations 114c and 114d shown on cover 102b (FIG. 2B). Indentation 114c and 114d of cover 102b have a predefined shape and surround respective cover bolts 108f and 108g of cover 102a, which also have the predefined shape. The indentations 114 enable the two PDUs 100A and 100B to be positioned flush against one another, thus saving space.

By putting two PDUs 100A and 100B together, the possible PDU applications increase, as the PDU assembly 200 supports at least four inputs and eight outputs. If a CC cover 134 or a GC cover 136 are added to the long sides of the PDU assembly 200, as in the PDU assembly 200B in FIG. 2C, the number of inputs and outputs may increase further. In exemplary embodiments, multiple PDUs 100 may be connected together, resulting in an increase in inputs/outputs supported with each additional PDU and an expansion of the applications/environments supported by the PDU assembly. The PDU assembly 200 is thus both modular and flexible in supporting a variety of PDU configurations.

Cable connectors 126a and 126b are shown on a short side of PDU 100A. The cable connectors 126 are secured to the base 104a using caps 112, although bolts, screws, rivets, etc., may also be used. The short side of PDU 100B, however, does not have cable connectors 126. Instead, the short side of PDU 100B is secured using cable connector covers 204a and 204b (collectively, "cable connector cover(s) 204"). Like the cable connectors 126, the cable connector covers 204 are secured to the short side of the PDU 100B using caps 112, although bolts, screws, rivets, etc., may instead be used. The cable connector covers 204 are thus useful when the PDU assembly 200A has two inputs rather than four.

The PDUs 100A and 100B of the PDU assembly 200 each have windows 118 on their long sides, one of which is visible in FIG. 2B. Window 118 on the outside surfaces of PDU 100B is covered by long side cover 106 using long side cover bolts 124. The window on the outside surface of PDU 100A (not visible) may be covered either by long side cover 106 or by CC cover 134, GC cover 136, or a custom cover, using long side cover bolts 124a-d.

The windows 118 on the inside long sides of PDUs 100A and 100B are coupled together using a connecting plate cover 202, as well as seals 122c and 122d. In exemplary embodiments, the connecting plate cover 202 connects between an outside edge of the window of the first PDU 100A and an outside edge of the window 118 of the second PDU 100B. A seal 122c is positioned around the window 118 and between the base 104a of PDU 100A and connecting plate cover 202; similarly, a seal 122d is positioned around the window and between the base 104b of PDU 100B and connecting plate cover 202. Long side cover bolts 124 are used to secure the connecting plate cover 202 to the base 104a. In exemplary embodiments, connecting plate cover 202 is bolted to one base (in FIG. 2B, base 104a) using long side cover bolts 124. Once the connecting plate cover 202 is secured, the PDU 100A is bolted to PDU 100B by inserting bolts 214a-d (FIG. 2B) and 214e-f (FIG. 2C) into bolt receivers 216a-b (FIG. 2B) (collectively, "bolt(s) 214" and "bolt receiver(s) 216").

Although the connecting plate cover 202 has an opening, it enables connection between two PDUs, thus providing a cover over the window 118. Thus, like the long side cover 106, the CC cover 134, the GC cover 136, and the custom cover, the connecting plate cover 202 is a cover to the window 118 since the window will be "covered" with a second PDU using the connecting plate cover 202. In all instances, the PDU assembly 200 is able to maintain IP67/IP69K protection, in exemplary embodiments.

Like the PDU 100, the PDU assembly 200 is flexible in its possible configurations. As illustrated in the PDU assembly 200B (FIG. 2C), the long side cover 106 of PDU 100D can be replaced with a CC cover 134, where the CC cover 134 has cable connector 126c with terminal 128c and cable connector 126d with terminal 128d. Alternatively, the long side cover 106 can be replaced with a GC cover 136 with gland-style connectors 110a-d. Or the long side cover (not shown) of PDU 100C can be replaced with the CC cover 134 or GC cover 136. The exposed long sides of either PDU 100C or 100D may also be affixed with custom covers.

The PDU assembly 200B features three sides with gland-style connectors 110: Gland-style connectors 110a-d are on GC cover 136 to be affixed to exposed long side of PDU 100C; gland-style connectors 110e-110h are on one short side of PDU 100C; and gland-style connectors 110i-1 are on one short side of PDU 100D. The differences in configurations between PDU assembly 200A (FIGS. 2A-B) and PDU assembly 200B (FIG. 2C) shows the flexibility and modularity of the PDU assembly over legacy PDUs.

In exemplary embodiments, the base 104 of the PDUs 100 have elements that double as grounding features and alignment features. In PDU 100B (FIG. 2A), alignment features 206a and 206b (collectively, "alignment feature(s) 206") are disposed on either side of window 118b of the long side 140a of base 104 (FIG. 1A). Used for grounding the base 104, a ring terminal is a terminal that is crimped on a wire and is circular in nature with a hole through which a bolt is inserted. The alignment features 206 feature wings that keep the ring terminal from rotating, enable two PDUs to be easily stacked against one another and properly aligned. On either side of window 118a of the long side 140b are common ground apertures 208a and 208b (collectively, "common ground aperture(s) 208"), shown in FIG. 2C as part of PDU 100D. The common ground apertures 208 receive a grounding wire so that the base 104, which is metal, can be connected to a common chassis or common grounding point.

In exemplary embodiments, the common ground apertures 208 on one PDU are shaped to mate with the alignment features 206 on a second PDU. In exemplary embodiments, the alignment features 206 are disposed on one long side 140a of the base 104 while the common ground apertures 208 are disposed on the other long side 140b of the base, with the alignment feature 206a being in the same plane as common ground aperture 208a and alignment feature 206b being in the same plane as common ground aperture 208b. Thus, the common ground apertures 208 are planar with the alignment features 206, which is useful for connecting bases 104 of two or more PDUs together.

A cross-sectional view of the PDU assembly 200C, with PDUs 100E and 100F, is shown in FIG. 2D. The PDU 100E has caps covering its short side cable connector inputs while the PDU 100F has cables inserted into its short side cable connector inputs. Once PDU 100E is coupled to PDU 100F, a sealed tunnel 212 is formed therebetween. The sealed tunnel 212 provides coupling means, such as cables and busbars, to connect between devices in adjacent PDUs 100.

Although two PDUs 100A and 100B form the PDU assembly 200, PDU assemblies may consist of three, four, and more PDUs stacked adjacent one another, as in FIGS. 2A and 2C. The PDU assembly 200 is thus modular and flexible, as is the underlying PDU 100. Where the PDU is a four-window configuration, the PDUs may be stacked into PDU assemblies with the short sides being connected to one another. The indentations 114 on long side 140 of the cover 102 would be similarly positioned on the short side 142 for the short side stacking configuration.

FIGS. 3A-3F are representative drawings of the base 104 of the PDU 100, according to exemplary embodiments. FIG. 3A is a perspective view, FIG. 3B is a first long side view, FIG. 3B is a second long side view, FIG. 3D is an overhead view, FIG. 3E is a first short side view, and FIG. 3F is a second short side view of the base 104. Long sides 140a-b and short sides 142a-b of PDU 100 are shown in FIGS. 3A and 3B to provide relative position information. In a non-limiting example, the base 104 has a generally rectangular top surface formed by the arrangements of long and shorts sides into a rectangular shape.

Fastener receptacles 144 are shown surrounding the base 104 and are designed to receive the cover fasteners 108 (FIG. 1B) of the cover 102. Fastener receptacle 144a is on short side 142b, fastener receptacles 144b-d are on long side 140b, fastener receptacle 144e is on short side 142a and fastener receptacles 144f-g are on long side 140a. The base 104 features four gland-style connector apertures 302a-d (collectively, "gland-style connector aperture(s) 302") on short side 142a which are circular in shape, designed to receive bolts such as gland-style connectors 110. The base 104 also features two cable apertures 304a-b (collectively, "cable aperture(s) 304") on short side 142b, also circular in shape and designed to receive cable connectors, such as cable connectors 126. Cable aperture 304a is centered inside input cable window 306a and cable aperture 304b is centered inside input cable window 306b (collectively, "input cable window(s) 306"). In a non-limiting example, the input cable windows 306 have a rounded rectangular shape suitable for receiving a cable connector cover 204 (FIG. 2A), which is also a rounded rectangular shape. The cable connector cover 204 is secured to input cable window 306 using caps 112 when the cables are not to be used in the PDU 100.

Windows 118a and 118b are shaped to be covered with the already introduced long side cover 106, CC cover 134, GC cover 136, or custom cover, with long side cover bolts 124 (FIG. 1B) being inserted into respective receivers 130. Receivers 130a-d surround window 118a (FIG. 3B) while receivers 130e-g surround window 118b (FIG. 3C). The alignment features 206a-b in FIG. 3C are oppositional to the common ground apertures 208a-b in FIG. 3B, each common ground being adjacent to a ground symbol, indicating the location for grounding the metal base 104.

FIGS. 4A-4E are representative drawings of the cover 102 used in the PDU 100, according to exemplary embodiments. FIG. 4A is a perspective view, FIG. 4B is an overhead view, FIG. 4C is a bottom view, FIG. 4D is a long side view, and FIG. 4E is a short side view of the cover 102. Long sides 140a-b and short sides 142a-b of PDU 100 are shown in FIGS. 4A-C to provide relative position information. Fastener receptacles 116a-g and indentations 114a-b, already introduced, are shown.

In a non-limiting example, the cover 102 is a rounded rectangular shape suitable for affixing to the base 104 which also has a rounded rectangular shape. A seal groove 404 is shown on the inside of the cover 102 for seating the seal 120. The center of the cover 102 may be raised up to accommodate PDU devices having a height higher than that of the base 104. In FIG. 4D, a first cover extension 402a is shown as a dotted line; in FIG. 4E, a second, taller cover extension 402b is shown (collectively, "cover extension(s) 402"). The cover extensions 402 increase the volume of the cavity formed by the base 104 and the cover 102 when secured to one another. The circumferential edges of the cover 102, on which the fastener receptacles 116 and indentations 114 are disposed, would remain unchanged if the cover includes a cover extension 402. In this way, the PDU 100 can accommodate PDU devices having different characteristics.

Figure 5A:
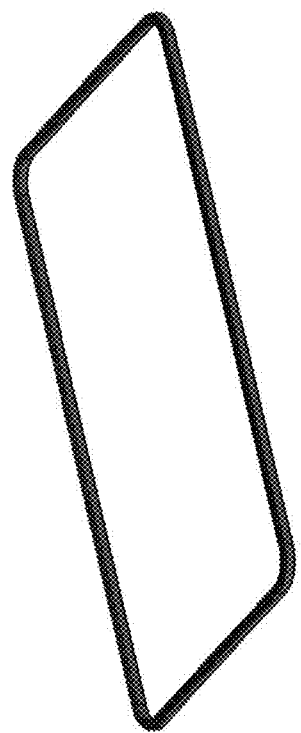
FIGS. 5A-5C are diagrams illustrating a seal of the PDU of FIGS. 1A-1C, in accordance with exemplary embodiments.
Figure 5B:
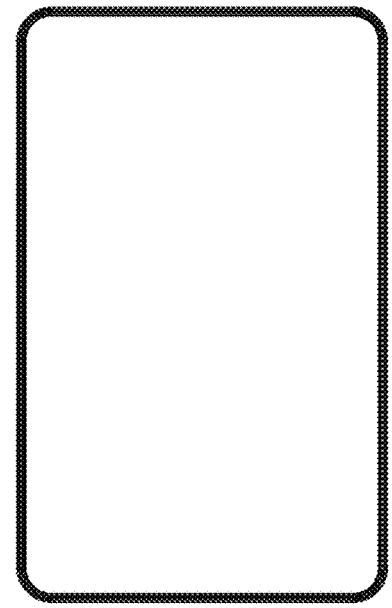
Figure 5C:

FIGS. 5A-5C are representative drawings of the seal 120 used by the PDU 100, according to exemplary embodiments. FIG. 5A is a perspective view, FIG. 5B is an overhead view, and FIG. 5C is a side view of the seal 120. The seal 120 is made of an elastomeric material, such as rubber, and is designed to form an airtight and liquid-tight seal between the cover 102 and the base 104, both of which are metal. The seal 120 is shaped to fit over the seal groove 404 of the cover 102 (FIG. 4C). Smaller seals, such as the seals 122 (FIG. 1B) similarly fit over the frames of windows 118 on the long sides 140 of the PDU 100. Where the PDU 100 has windows on the short sides 142, smaller seals conforming to the frame of the windows on the short sides can be used. Whatever the size, the seal 120, seals 122, and smaller window seals (where present) are present to facilitate airtight and liquid-tight sealing of the PDU 100, thus ensuring the long-term health of the PDU devices contained with the PDU cavity.

FIGS. 6A-6D are representative drawings of the long side cover 106 for use in the PDU 100, according to exemplary embodiments. FIG. 6A is a perspective view, FIG. 6B is an overhead view, FIG. 6C is a side view, and FIG. 6D is a bottom view of the long side cover 106.

The long side cover 106 is placed over the window 118 on a long side 140 of the PDU 100 (FIGS. 1A-C). Where the PDU 100 has windows on the short sides 142 of the base 104, the long side cover 106 may be used thereon, with some adjustment for the smaller sized windows. The long side cover 106 includes apertures 602a-d (collectively, "aperture(s) 602") around its periphery for receiving long side cover bolts 124. The long side cover bolts 124 fit through the apertures 602 and then fit into receivers 130 that surround the windows 118 in the base 104 (FIGS. 3B-3C).

The long side cover 106 further has a raised portion 604 (FIG. 6B) and a seal groove 606 (FIG. 6D). In exemplary embodiments, the raised portion 604 facilitates holding/catching the seal 122, which fits into the seal groove 606. A custom cover may be fashioned by removing the raised portion 604 and replacing it with the custom interface, based on the desired application. Practically, however, the custom cover would be generated from scratch, such as by stamping or casting, as the custom cover would be conductive. Nevertheless, the raised portion 604 shows the portion of the cover that would be modified. A seal such as seal 122 (FIG. 1B) fits into the seal groove 606 before the long side cover 106 is affixed over the window 118.

Figure 7B:
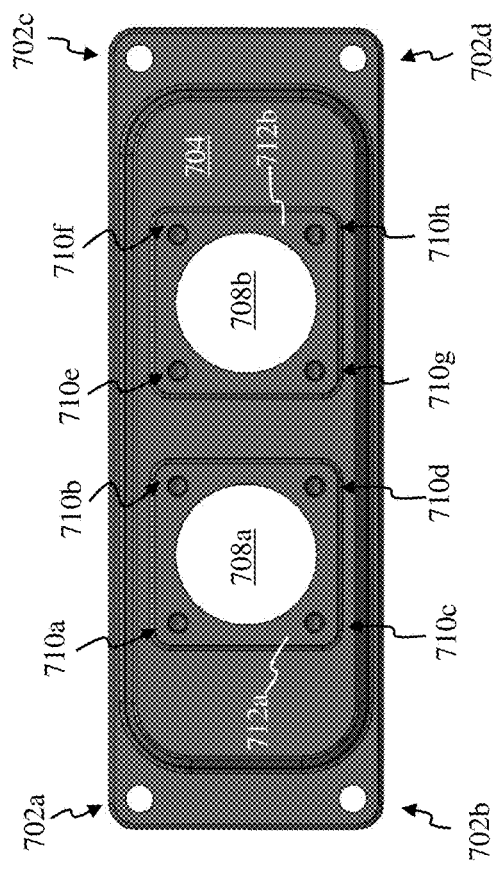
FIGS. 7A-7D are diagrams illustrating an input cover of the PDU of FIGS. 1A-1C, in accordance with exemplary embodiments.
Figure 7D:
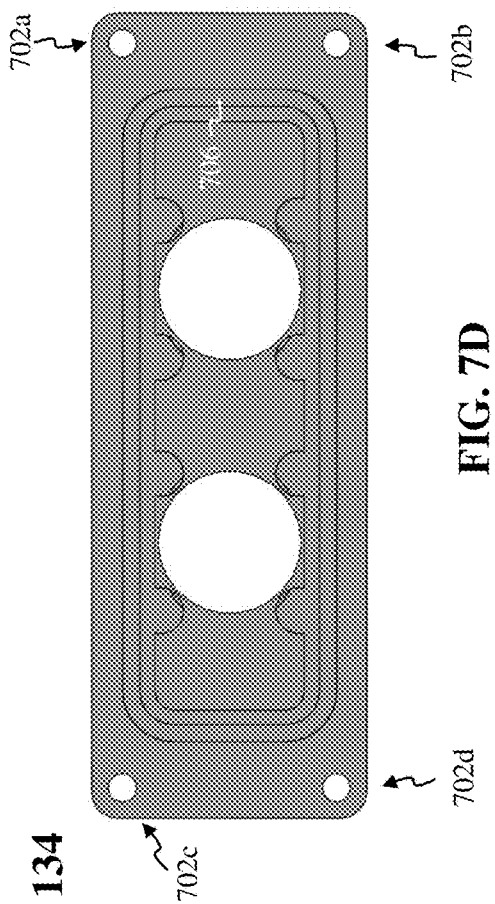
Figure 7A:
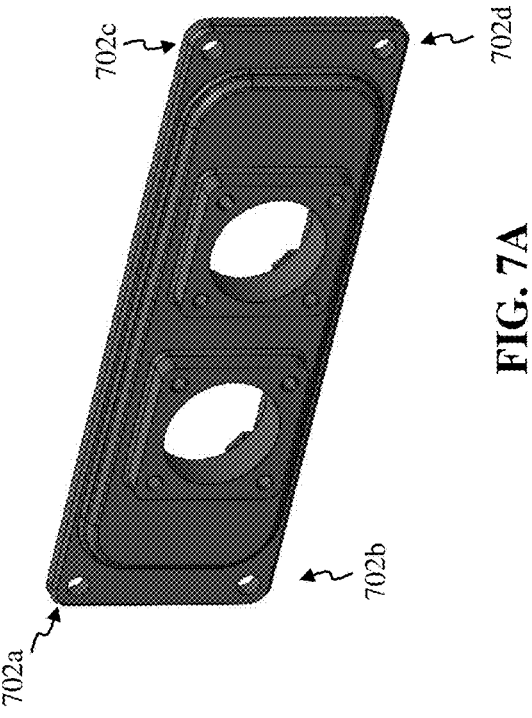
Figure 7C:
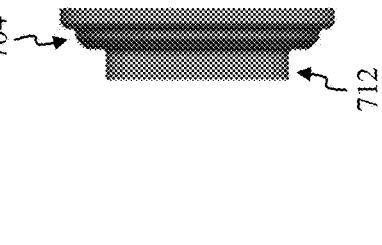

FIGS. 7A-7D are representative drawings of the cable connector (CC) cover 134 for use in the PDU 100, according to exemplary embodiments. FIG. 7A is a perspective view, FIG. 7B is an overhead view, FIG. 7C is a side view, and FIG. 7D is a bottom view of the CC cover 134. Used to house cable connectors 126 (FIG. 2C) on the long side 140 of the PDU 100, the CC cover 134 is secured over a window 118 using long side cover bolts 124. Accordingly, the CC cover 134 includes bolt apertures 702a-d (collectively, "bolt aperture(s) 702") around its periphery for receiving long side cover bolts 124. The long side cover bolts 124 fit through the bolt apertures 702 and then fit into receivers 130 that surround the windows 118 in the base 104 (FIGS. 3B-3C).

The CC cover 134 further has a raised portion 704 (FIG. 7B) and a seal groove 706 (FIG. 7D). Within the raised portion 704 are two cover faces 712a and 712b (collectively, "cover face(s) 712"). Cover face 712a features cable aperture 708a and cover face 712b features cable aperture 708b (collectively, "cable aperture(s) 708"). The cable apertures 708 are sized to receive a cable connector such as cable connector 126 (FIG. 1B).

Cover face 712a includes bolt receptacles 710a-d and cover face 712b includes bolt receptacles 710e-h (collectively, 'bolt receptacle(s) 710"). The cables 126 also have a rounded rectangular frame surrounding the cylindrical portion. Cables 126 are inserted into the cable apertures 708 and then secured by inserting the caps 112 through bolt receptacles in the rounded rectangular frame and then into the bolt receptacles 710 of the CC cover 134. If one or both cable connectors 126 are not used, the caps 112 can instead be used to secure a cable connector cover 204 (FIG. 2A) over the cover faces 712, which are sized to fit the cable connector cover thereto. A seal, such as seal 122 (FIG. 1B), fits into the seal groove 706 before the CC cover 134 is affixed over the window 118.

FIGS. 8A-8D are representative drawings of a gland-style connector (GC) cover for use in the PDU 100, according to exemplary embodiments. FIG. 8A is a perspective view, FIG. 8B is an overhead view, FIG. 8C is a side view, and FIG. 8D is a bottom view of the GC cover 136. Used to house gland-style connectors 110 (FIG. 1C) on the long side 140 of the PDU 100, the GC cover 136 is secured over a window 118 using long side cover bolts 124. Accordingly, the GC cover 136 includes apertures 802a-d (collectively, "bolt aperture(s) 802") around its periphery for receiving long side cover bolts 124. The long side cover bolts 124 fit through the apertures 802 and then fit into receivers 130 that surround the windows 118 in the base 104 (FIGS. 3B-3C).

The GC cover 136 further has a raised portion 804 (FIG. 8B) and a seal groove 806 (FIG. 8D). Within the raised portion 804 are four gland-style connector receptacles 810a-d (collectively, "gland-style connector receptacle(s) 810"). Each gland-style connector receptacle 810 features a respective gland-style connector aperture 808a-d (collectively, "gland-style connector aperture(s) 808"). The termination apertures 808 are sized to receive a gland-style connector such as gland-style connector 110 (FIG. 1C). A seal, such as seal 122 (FIG. 1B), fits into the seal groove 806 before the GC cover 136 is affixed over the window 118.

FIGS. 9A-9D are representative drawings of the connecting plate cover 202 for use in the PDU 100, according to exemplary embodiments. FIG. 9A is a perspective view, FIG. 9B is an overhead view, FIG. 9C is a side view, and FIG. 9D is a bottom view of the connecting plate cover 202. The connecting plate cover 202 is placed between two PDUs 100 so as to form a connecting seal therebetween (FIG. 2B). The windows 118 on the short sides 142 of adjacent PDUs 100 are joined to form a cavity, the sealed tunnel 212 (FIG. 2D) through which cabling and busbars are disposed. The connecting plate cover 202 includes apertures 902a-d (collectively, "bolt aperture(s) 902") around its periphery for receiving long side cover bolts 124. The long side cover bolts 124 fit through the apertures 902 and then fit into receivers 130 that surround the windows 118 in the base 104 (FIGS. 3B-3C).

Raised portion 904 (FIG. 9C) is shaped to fit flush against the periphery of the window 118. In exemplary embodiments, a portion of raised portion 904 fits inside the window 118. The connecting plate cover 202 further has an opening 908 for forming a small cavity and also establishing a liquid- and debris-tight connection between two PDUs 100. Seal grooves 606a and 606b are formed on first side (FIG. 9B) and second side (FIG. 9D), respectively, of the connecting plate cover 202. In exemplary embodiments, the connecting plate cover 202 is connected to the base of one PDU, then the PDU is screwed to a second PDU.

Figure 10C:
FIGS. 10A-10C are diagrams illustrating a seal of the PDU of FIGS. 1A-1C, in accordance with exemplary embodiments.
Figure 10A:
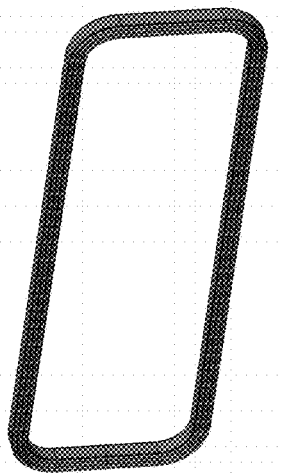
Figure 10B:
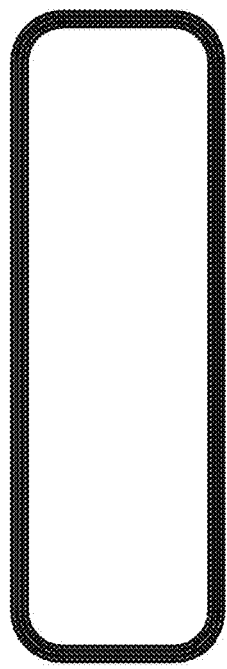

FIGS. 10A-10C are representative drawings of the seal 122 used by the PDU 100, according to exemplary embodiments. FIG. 10A is a perspective view, FIG. 10B is an overhead view, and FIG. 10C is a side view of the seal 122. The seal 122 is made of an elastomeric material, such as rubber, and is designed to form an airtight and liquid-tight seal between the long side cover 106, the CC cover 134, the GC cover 136, the connecting plate cover 202, or the custom cover, and the base 104, both of which are metal. The seal 122 is shaped to fit over the seal groove 606 of the long side cover 106 (FIG. 6D), the seal groove 706 of the CC cover 134, the seal groove 806 of the GC cover 136, the seal groove 906 of the connecting plate cover 202, or the seal groove of a custom cover. Where the PDU 100 has windows on the short sides 142, smaller seals conforming to the frame of the windows on the short sides could be used. Whatever the size, the seal 122 and smaller window seals (where present) are present to facilitate airtight and liquid-tight sealing of the PDU 100, thus ensuring the long-term health of the PDU devices contained with the PDU cavity.

The modularity of the PDU 100 and PDU assembly 200 provide flexibility to succeed in many different environments. Legacy PDUs have aluminum boxes, connectors coming in one side and connectors going out another side. But the PDU 100 and PDU assembly 200 enable both the number and position of inputs and outputs to be customized to the application. This highly modular design is enhanced by providing IP67/IP69K compliance.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A power distribution unit (PDU) comprising:
a first short side and a first long side, wherein the first long side is orthogonal to the first short side;
a first cover comprising:
a plurality of fastener receptacles disposed along an edge of the first cover; and
a pair of indentations disposed along the edge on the first long side;
a base comprising:
a first opening disposed on the first short side, the first opening to receive a first cable connector; and
a window disposed on the first long side, wherein the window is secured to a long side cover to close off the window and replaceable with a second cover to enable input or output cables or a second PDU to be attached thereto.

2. The PDU of claim 1, wherein the first cover, when secured to the base, and the base form a cavity that is protected against an ingress of liquids and debris.

3. The PDU of claim 1, wherein each of the pair of indentations is disposed between two of the plurality of fastener receptacles.

4. The PDU of claim 1, the long side cover comprising a seal groove to seat a seal, wherein the seal is disposed between a circumferential edge of the window and the long side cover.

5. The PDU of claim 1, the second cover further comprising a cable connector cover, the cable connector cover comprising a connector opening sized to receive a second cable connector.

6. The PDU of claim 1, the second cover further comprising a gland-style connector cover, the gland-style connector cover comprising a connector opening sized to receive a gland-style connector.

7. The PDU of claim 1, the second cover further comprising a connecting plate, the connecting plate to couple the PDU to the second PDU.

8. The PDU of claim 7, further comprising a second short side and a second long side, the base further comprising a second opening disposed on the second short side, the second opening to receive a gland-style connector.

9. The PDU of claim 8, the base further comprising a pair of alignment features disposed on the second long side, the pair of alignment features to align the PDU with the second PDU.

10. The PDU of claim 9, the base further comprising a pair of common ground apertures disposed on the second short side, wherein the pair of common ground apertures are planar with the pair of alignment features.

11. A power distribution unit (PDU) assembly comprising:
a first PDU comprising:
a first base comprising a rectangular top surface and a first long side surface having a first window; and a first cover comprising a circumferential edge having a plurality of fastener receptacles, wherein the circumferential edge is shaped to fit over the rectangular top surface; and a second PDU comprising:
  a second base comprising a second long side surface having a second window; and
  a connecting plate comprising a first raised portion on one side, wherein the first raised portion is shaped to fit into the first window, wherein the connecting plate mates the first PDU with the second PDU, and wherein the connecting plate is replaceable with a long side cover to close off the second window.

12. The PDU assembly of claim 11, further comprising:
a first seal disposed between a first outside edge of the first window and the connecting plate; and
a second seal disposed between a second outside edge of the second window and the connecting plate.

13. The PDU assembly of claim 12, wherein the first window, the connecting plate, and the second window form a sealed tunnel between the first PDU and the second PDU.

14. The PDU assembly of claim 13, wherein the sealed tunnel is IP67/IP69K compliant.

15. The PDU assembly of claim 11, the second PDU further comprising a second cover, the second cover comprising a pair of indentations of a predefined shape, the plurality of fastener receptacles of the first cover also having the predefined shape.

16. The PDU assembly of claim 15, wherein the pair of indentations of the second cover fit around two of the plurality of fastener receptacles of the first cover.

17. The PDU assembly of claim 11, wherein:
the first base further comprises a first alignment feature and a second alignment feature; and
the second base further comprises a first common ground aperture and a second common ground aperture;
wherein the first alignment feature mates with the first common ground aperture and the second alignment feature mates with the second common ground aperture when the first PDU is mated with the second PDU.

18. The PDU assembly of claim 11, wherein the first base further comprises:
a first short side adapted to receive two cable connectors; and
a second short side adapted to receive four gland-style connectors.

19. The PDU assembly of claim 18, wherein the second base further comprises:
a third short side adapted to receive one or more cable connectors; and
a fourth short side adapted to receive one or more gland-style connectors.

20. The PDU assembly of claim 19, wherein a pair of cable connector covers are affixed to the third short side.

* * * * *